(12) United States Patent
Nanda et al.

(10) Patent No.: US 11,023,333 B2
(45) Date of Patent: Jun. 1, 2021

(54) ONLINE RECOVERY APPROACH TO SPACE ACCOUNTING

(71) Applicant: EMC IP Holding Company LLC, Hopkinton, MA (US)

(72) Inventors: Kumari Bijayalaxmi Nanda, Edison, NJ (US); Dixit Patel, Monroe, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 258 days.

(21) Appl. No.: 16/175,140

(22) Filed: Oct. 30, 2018

(65) Prior Publication Data

US 2020/0133797 A1   Apr. 30, 2020

(51) Int. Cl.
*G06F 16/00* (2019.01)
*G06F 11/14* (2006.01)
*G06F 16/16* (2019.01)

(52) U.S. Cl.
CPC ........ *G06F 11/1469* (2013.01); *G06F 16/164* (2019.01)

(58) Field of Classification Search
None
See application file for complete search history.

(56) References Cited

U.S. PATENT DOCUMENTS

| | | | |
|---|---|---|---|
| 8,996,490 B1 | 3/2015 | Armangau et al. | |
| 9,146,921 B1 | 9/2015 | Vempati et al. | |
| 9,471,595 B1 | 10/2016 | Vempati et al. | |
| 9,600,487 B1 | 3/2017 | Pandian et al. | |
| 9,632,892 B1 | 4/2017 | Sledz et al. | |
| 9,652,568 B1 | 5/2017 | Tzelnic et al. | |
| 9,665,581 B1 | 5/2017 | Patel et al. | |
| 9,710,165 B1 * | 7/2017 | Lherault | G06F 3/0608 |
| 9,830,103 B2 * | 11/2017 | Pundir | G06F 3/0608 |
| 9,846,539 B2 * | 12/2017 | Babu | G06F 11/1407 |
| 9,846,544 B1 | 12/2017 | Bassov | |
| 9,916,191 B1 | 3/2018 | Pan et al. | |
| 9,934,104 B2 | 4/2018 | Kushwah et al. | |
| 9,965,381 B1 | 5/2018 | Sahin et al. | |
| 10,037,156 B1 | 7/2018 | Zhuang et al. | |
| 10,061,654 B1 | 8/2018 | Patwardhan et al. | |
| 10,152,233 B2 * | 12/2018 | Xu | G06F 16/13 |
| 10,331,457 B2 * | 6/2019 | Costa | G06F 9/442 |

* cited by examiner

*Primary Examiner* — Debbie M Le
(74) *Attorney, Agent, or Firm* — BainwoodHuang

(57) ABSTRACT

Techniques for performing online recovery of space accounting metadata. The techniques include reestablishing a plurality of counters for tracking amounts of physical storage space committed and/or unique to the volumes and/or volume families. The techniques include, while reestablishing the counters, conducting a tree walk through a mapping hierarchy of each volume and/or volume family, marking starting and ending points through the mapping hierarchy, and monitoring a logical offset from the starting point during the tree walk. Upon receipt of an IO request, the techniques determine whether the IO request and space accounting metadata recovery activities are attempting to access the same metadata based on the logical offset relative to the starting point, and update the counters and/or temporary versions of the counters, as appropriate. By providing such techniques, metadata inconsistencies can be addressed while allowing users of the data storage system full or at least partial access to their data.

14 Claims, 8 Drawing Sheets

US 11,023,333 B2

ONLINE RECOVERY APPROACH TO SPACE ACCOUNTING

BACKGROUND

Data storage systems include storage processors coupled to arrays of non-volatile storage devices, such as magnetic disk drives, electronic flash drives, and/or optical drives. The storage processors are configured to service storage input/output (IO) requests received from host computers, which send the storage IO requests to the data storage systems over one or more networks. The storage IO requests specify data pages, data files, data blocks, and/or other data elements to be written to, read from, created on, and/or deleted from data volumes, file systems, and/or other storage objects stored on the respective non-volatile storage devices. Computer software application programs running on the storage processors are configured to manage the received storage IO requests, and to perform various data processing tasks to organize and/or secure the data elements and/or storage objects on the non-volatile storage devices.

From time to time, data files of a file system stored on a data storage system may become corrupted. Such corruption of data files may be due to metadata associated with the data files being erased or failing to update correctly in response to changes in content of the data files, possibly resulting in an inability to access the data file content. Having detected such data file corruption, the data storage system executes a file system checking (FSCK) utility to address and/or repair any inconsistencies in the metadata caused by the data file corruption, thereby restoring the integrity of the file system stored on the data storage system.

SUMMARY

Having to execute or run an FSCK utility in a data storage system can be problematic, however, in that such an FSCK utility can require hours or days to address and/or repair metadata inconsistencies in a file system, which can have a size of one or more terabytes (Tb). Further, because data files in the file system cannot be written to while the FSCK utility is running, the data storage system is typically brought offline, preventing users from accessing their data stored on the data storage system while file system checking is taking place.

Techniques are disclosed herein for performing recovery (i.e., checking and fixing) of space accounting metadata (including counters) while a data storage system is online for regular user data access. Each volume family can include at least one branch, and each branch can include one or more child volumes (e.g., snapshot volumes) that are sequential copies of a parent volume. The disclosed techniques can be performed while the data storage system is online, allowing users of the data storage system full or at least partial access to their stored data while space accounting metadata recovery activities are in progress. The disclosed techniques can include reestablishing a plurality of counters for tracking amounts of physical storage space that are committed and/or unique to the data volumes and/or volume families, including (i) a first counter that can track a first amount of physical storage space (referred to herein as the "VolumeCommittedCount") committed to each data volume in each branch of a respective volume family, (ii) a second counter that can track an amount of physical storage space (referred to herein as the "FamilyCommittedCount") committed to a respective volume family, and (iii) a third counter that can track an amount of physical storage space (referred to herein as the "FamilyUniqueCount") unique to (or unshared by) a respective volume family.

The disclosed techniques can further include, while reestablishing the respective counters, conducting a tree walk through a mapping hierarchy of each data volume and/or volume family, marking a starting point and an ending point for the tree walk through the mapping hierarchy, and monitoring a logical offset from the starting point during the tree walk. Upon receipt of a storage input/output (IO) request at the data storage system, the disclosed techniques can determine whether the storage IO request and the space accounting activities are attempting to access the same region of metadata, based on the logical offset relative to the starting point and/or ending point of the tree walk. Based on the result of the determination, the disclosed techniques can update the VolumeCommittedCount, the FamilyCommittedCount, and/or the FamilyUniqueCount, and/or temporary "bookkeeping" versions of the VolumeCommittedCount, the FamilyCommittedCount, and/or the FamilyUniqueCount, as appropriate. By providing techniques for performing recovery (i.e., checking and fixing) of space accounting metadata (including counters) while a data storage system is online for regular user data access, metadata inconsistencies can be addressed and/or repaired while still allowing users of the data storage system full or at least partial access to their stored data.

In certain embodiments, a method of performing recovery of space accounting metadata while a data storage system is online for regular user data access includes, in an online process, performing recovery of space accounting metadata of at least one data volume in a volume family, including accessing a region of metadata pertaining to the at least one data volume in the volume family, and maintaining corresponding metadata pertaining to the at least one data volume in the volume family. The method further includes receiving a storage IO request for servicing at the data storage system, and determining whether the servicing of the storage IO request includes accessing the same region of metadata being accessed in the recovery of space accounting metadata of the at least one data volume in the volume family. The method further includes, having determined that the servicing of the storage IO request includes accessing the same region of metadata as being accessed in the recovery of space accounting metadata of the at least one data volume in the volume family, permitting access to the region of metadata for servicing of the storage IO request, thereby assuring prompt access to data stored on the data storage system.

In certain arrangements, the performing of the recovery of the space accounting metadata of the at least one data volume in the volume family includes detecting a discrepancy in an amount of physical storage space committed to a respective data volume in a branch of the volume family.

In certain arrangements, the performing of the recovery of the space accounting metadata of the at least one data volume in the volume family further includes setting a starting point and an ending point for a tree walk through a mapping hierarchy to verify space accounting metadata for the respective data volume, in which the space accounting metadata corresponds to a first count representative of the amount of physical storage space committed to the respective data volume.

In certain arrangements, the performing of the recovery of the space accounting metadata of the at least one data volume in the volume family further includes maintaining corresponding space accounting metadata for the respective data volume, in which the maintained corresponding space accounting metadata corresponds to a newly calculated count representative of the amount of physical storage space committed to the respective data volume.

In certain arrangements, the performing of the recovery of the space accounting metadata of the at least one data volume in the volume family further includes performing the tree walk through the mapping hierarchy for the respective data volume from the starting point to the ending point.

In certain arrangements, the performing of the recovery of the space accounting metadata of the at least one data volume in the volume family further includes, upon receipt of the storage IO request, checking a current logical offset from the starting point for the tree walk, and determining whether the servicing of the storage IO request includes accessing the same region of metadata being accessed in the recovery of the space accounting metadata based on the current logical offset.

In certain arrangements, the method further includes determining that the recovery of the space accounting metadata of the at least one data volume in the volume family has proceeded past the region of metadata being accessed by the storage IO request, and, having determined that the recovery of the space accounting metadata of the at least one data volume in the volume family has proceeded past the region of metadata being accessed by the storage IO request, updating the first count representative of the amount of physical storage space committed to the respective data volume, and updating the newly calculated count representative of the amount of physical storage space committed to the respective data volume.

In certain arrangements, the method further includes determining that the recovery of the space accounting metadata of the at least one data volume in the volume family has not proceeded past the region of metadata being accessed by the storage IO request, and, having determined that the recovery of the space accounting metadata of the at least one data volume in the volume family has not proceeded past the region of metadata being accessed by the storage IO request, updating the first count representative of the amount of physical storage space committed to the respective data volume.

In certain arrangements, the performing of the recovery of the space accounting metadata of the at least one data volume in the volume family further includes checking a current logical offset from the starting point for the tree walk, and determining whether the recovery of the space accounting metadata of the at least one data volume in the volume family has completed based on the current logical offset reaching the ending point for the tree walk.

In certain arrangements, the performing of the recovery of the space accounting metadata of the at least one data volume in the volume family further includes, having determined that the recovery of the space accounting metadata of the at least one data volume in the volume family has completed, replacing the first count representative of the amount of physical storage space committed to the respective data volume with the newly calculated count representative of the amount of physical storage space committed to the respective data volume.

In certain arrangements, the performing of the recovery of the space accounting metadata of the at least one data volume in the volume family includes detecting a discrepancy in an amount of physical storage space committed or unique to the volume family.

In certain arrangements, the performing of the recovery of the space accounting metadata of the at least one data volume in the volume family further includes setting a starting point and an ending point for a tree walk through a mapping hierarchy to verify space accounting metadata for the volume family, the space accounting metadata corresponding to a count representative of the amount of physical storage space committed or unique to the volume family.

In certain arrangements, the performing of the recovery of the space accounting metadata of the at least one data volume in the volume family further includes maintaining corresponding space accounting metadata for the volume family, the maintained corresponding space accounting metadata corresponding to a newly calculated count representative of the amount of physical storage space committed or unique to the volume family.

In certain arrangements, the performing of the recovery of the space accounting metadata of the at least one data volume in the volume family further includes checking a current logical offset from the starting point for the tree walk, and determining whether the recovery of the space accounting metadata of the volume family has completed based on the current logical offset reaching the ending point for the tree walk.

In certain arrangements, the performing of the recovery of the space accounting metadata of the at least one data volume in the volume family further includes, having determined that the recovery of the space accounting metadata of the volume family has completed, replacing the count representative of the amount of physical storage space committed or unique to the volume family with the newly calculated count representative of the amount of physical storage space committed or unique to the volume family.

In certain embodiments, a data storage appliance configured to perform recovery of space accounting metadata while online for regular user data access includes at least one storage device configured to store a plurality of data volumes of a volume family, a memory configured to store executable instructions, and storage processing circuitry configured to execute the executable instructions out of the memory, in an online process, (i) to perform recovery of space accounting metadata of at least one data volume in the volume family, the recovery of the space accounting metadata including accessing a region of metadata pertaining to the at least one data volume in the volume family, and maintaining corresponding metadata pertaining to the at least one data volume in the volume family; (ii) to receive a storage IO request; (iii) to determine whether servicing of the storage IO request includes accessing the same region of metadata being accessed in the recovery of the space accounting metadata of the at least one data volume in the volume family; and (iv) having determined that the servicing of the storage IO request includes accessing the same region of metadata as being accessed in the recovery of the space accounting metadata of the at least one data volume in the volume family, to permit access to the region of metadata for servicing of the storage IO request, thereby assuring prompt access to data stored on the data storage system.

Other functions and aspects of the claimed features of this disclosure will be evident from the Detailed Description that follows.

BRIEF DESCRIPTION OF THE DRAWINGS

The foregoing and other objects, features and advantages will be apparent from the following description of particular, embodiments of the disclosure, as illustrated in the accompanying drawings in which like reference characters refer to the same parts throughout the different views.

FIG. 1b is a block diagram of an exemplary data storage appliance included in the clustered storage environment of FIG. 1a;

FIG. 5b is a block diagram of a detailed view of the first key-value store of FIG. 5a;

DETAILED DESCRIPTION

Techniques are disclosed herein for performing recovery of space accounting metadata while a data storage system is online for regular user data access. The disclosed techniques can include reestablishing a plurality of counters for tracking amounts of physical storage space that are committed and/or unique to the data volumes and/or volume families. The disclosed techniques can further include, while reestablishing the respective counters, conducting a tree walk through a mapping hierarchy of each data volume and/or volume family, marking a starting point and an ending point for the tree walk through the mapping hierarchy, and monitoring a logical offset from the starting point during the tree walk. Upon receipt of a storage input/output (IO) request at the data storage system, the disclosed techniques can determine whether or not the storage IO request and the space accounting metadata recovery activities are attempting to access the same region of metadata based on the logical offset relative to the starting point and/or ending point of the tree walk, and update the respective counters and/or temporary "bookkeeping" versions of the counters, as appropriate. By providing techniques for performing recovery (i.e., checking and fixing) of space accounting metadata (including counters) while a data storage system is online for regular user data access, metadata inconsistencies can be addressed and/or repaired while still allowing users of the data storage system full or at least partial access to their stored data.

Figure 1B:
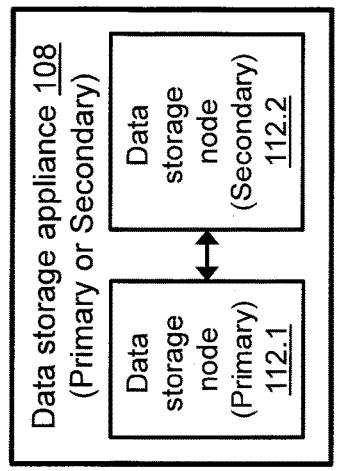
Figure 1A:
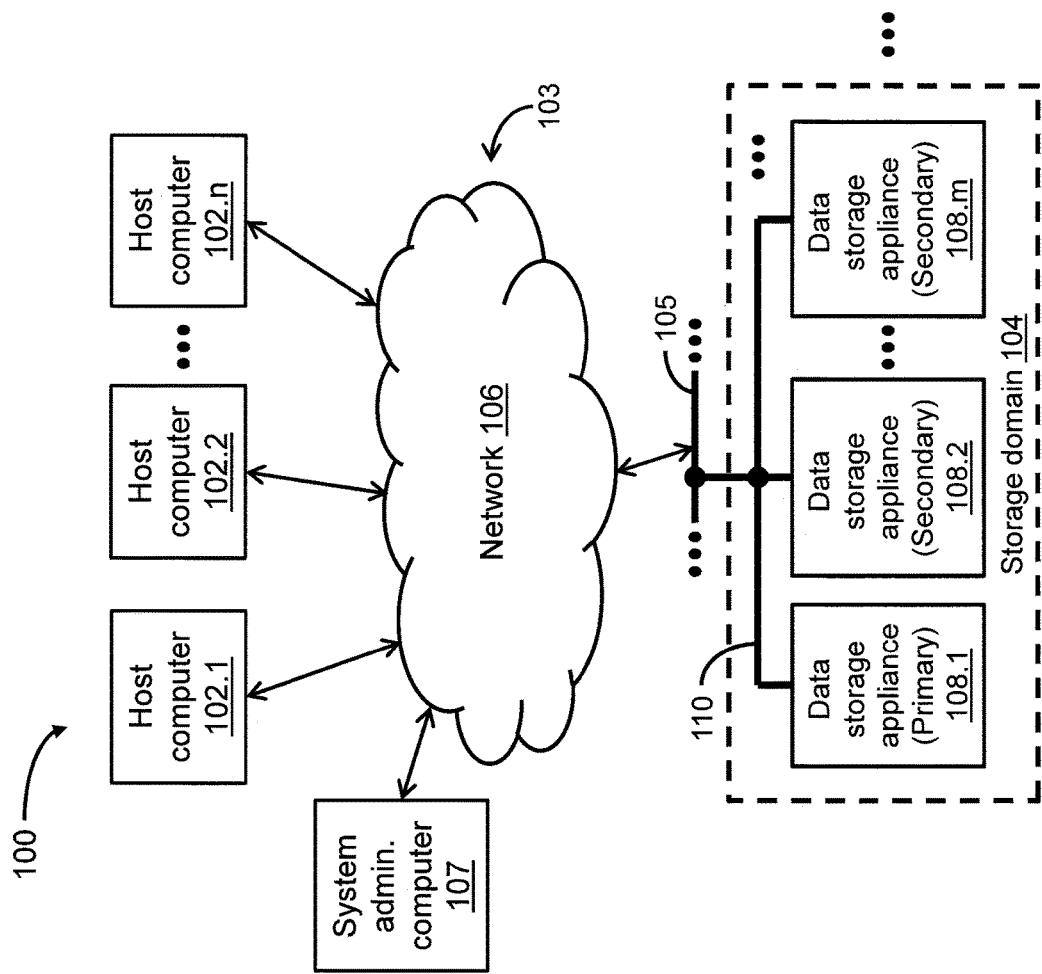
FIG. 1a is a block diagram of an exemplary clustered storage environment, in which techniques may be practiced for performing recovery of space accounting metadata while a data storage system is online for regular user data access.

FIG. 1a depicts an illustrative embodiment of a clustered storage environment 100, in which techniques can be practiced for performing recovery (i.e., checking and fixing) of space accounting metadata (including counters) while a data storage system is online for regular user data access. As shown in FIG. 1a, the clustered storage environment 100 can include a plurality of host computers 102.1, 102.2, . . . , 102.n, at least one storage domain 104, and a system administrator computer 107, which are interconnected by a communications medium 103 that can include at least one network 106. For example, each of the plurality of host computers 102.1, . . . , 102.n may be configured as a web server computer, a file server computer, an email server computer, an enterprise server computer, or any other suitable client or server computer or computerized device. Further, the system administrator computer 107 may be remote from (such as in a data center) or local to the storage domain 104 within the clustered storage environment 100.

As further shown in FIG. 1a, the storage domain 104 can include, as members of the storage domain 104, a plurality of data storage appliances 108.1, 108.2, . . . , 108.m. In the storage domain 104, the data storage appliance 108.1 can be elected or otherwise designated to perform (at least temporarily) a role of a primary storage appliance, while each of the remaining data storage appliances 108.2, . . . , 108.m perform (at least temporarily) a role of a secondary storage appliance. The storage domain 104 can further include a local area network (LAN) 110 such as an Ethernet network or any other suitable network, which is configured to interconnect the plurality of data storage appliances 108.1, . . . , 108.m. A plurality of LANs (like the LAN 110) included in a plurality of storage domains (like the storage domain 104) can be interconnected by a network 105, such as a metropolitan area network (MAN), a wide area network (WAN), or any other suitable network.

Within the clustered storage environment 100 of FIG. 1a, the system administrator computer 107 can be configured to execute program instructions to enable a system administrator or other user to define and/or configure the storage domain 104. Further, the plurality of host computers 102.1, . . . , 102.n can be configured to provide, over the network 106, storage input/output (IO) requests (e.g., small computer system interface (SCSI) commands, network file system (NFS) commands) to the respective storage appliances (primary or secondary) 108.1, . . . , 108.m of the storage domain 104. For example, such storage IO requests (e.g., read requests, write requests) may direct the respective storage appliances (primary or secondary) 108.1, . . . , 108.m to read and/or write data pages, data files, data blocks, and/or any other suitable data elements from/to data volumes (e.g., virtual volumes (VVOLs), logical units (LUNs)), file systems, and/or any other suitable storage objects stored in association with the respective storage appliances 108.1, . . . , 108.m.

The communications medium 103 can be configured to interconnect the plurality of host computers 102.1, . . . , 102.n with the respective storage appliances 108.1, . . . , 108.m of the storage domain 104 to enable them to communicate and exchange data/control signals. As shown in FIG. 1a, the communications medium 103 is illustrated as a "cloud" to represent a variety of different communications topologies, including, but not limited to, a backbone topology, a hub and spoke topology, a loop topology, an irregular topology, or any suitable combination thereof. As such, the communications medium 103 can include, but is not limited to, copper-based data communications devices and cabling, fiber optic devices and cabling, wireless devices, or any suitable combination thereof. Further, the communications medium 103 can be configured to support storage area network (SAN)-based communications, network attached storage (NAS)-based communications, LAN-based communications, MAN-based communications, WAN-based communications, wireless communications, distributed infrastructure communications, and/or any other suitable wired, wireless, or fiber communications.

FIG. 1b depicts an illustrative embodiment of an exemplary data storage appliance 108 included in the storage domain 104 of FIG. 1a. It is noted that each of the data storage appliances (primary or secondary) 108.1, ..., 108.m included in the storage domain 104 can be configured like the data storage appliance 108 of FIG. 1b. As shown in FIG. 1b, the data storage appliance 108 can include two (2) data storage nodes 112.1, 112.2 for providing high availability within the clustered storage environment 100. In the data storage appliance 108, the data storage node 112.1 can be elected or otherwise designated to perform (at least temporarily) a role of a primary storage node, while the data storage node 112.2 performs (at least temporarily) a role of a secondary storage node. For example, in the data storage appliance 108, the data storage node (primary) 112.1 may (i) receive storage IO requests from one or more of the host computers 102.1, ..., 102.n over the network 106, (ii) in response to the storage IO requests, read and/or write data pages, data files, data blocks, and/or any other suitable data elements from/to one or more VVOLs, LUNs, file systems, and/or any other suitable storage objects stored in association with the data storage node (primary) 112.1, and, (iii) at least at intervals, synchronize data stored in association with the data storage node (primary) 112.1 with corresponding data stored in association with the data storage node (secondary) 112.2. In the event of a failure of the data storage node (primary) 112.1, the data storage node (secondary) 112.2 can assume the role of the primary storage node, providing high availability within the clustered storage environment 100.

Figure 1C:
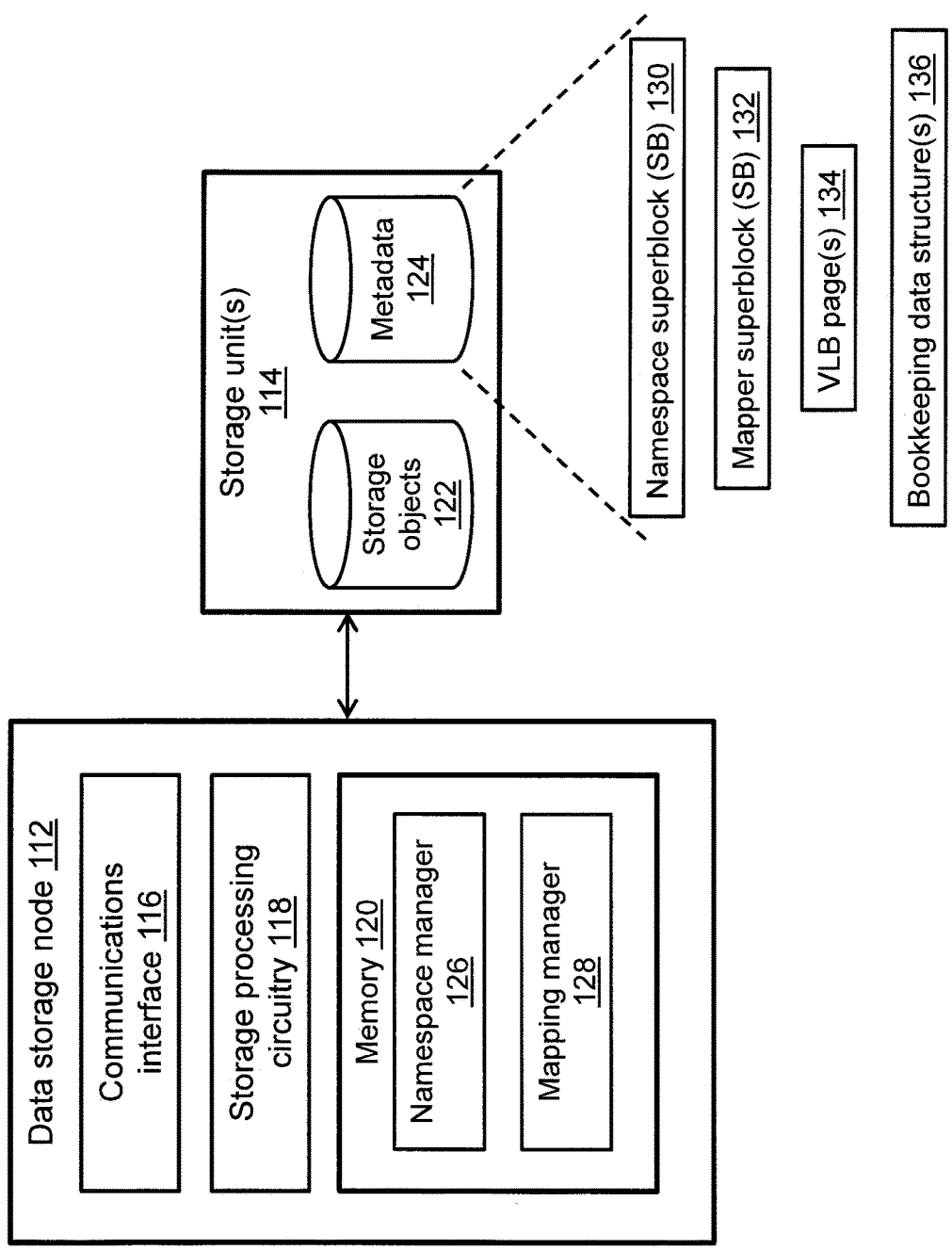
FIG. 1c is a block diagram of an exemplary data storage node included in the data storage appliance of FIG. 1b.

FIG. 1c depicts an illustrative embodiment of an exemplary data storage node 112 included in the data storage appliance 108 of FIG. 1b. It is noted that each of the data storage nodes (primary and secondary) 112.1, 112.2 of FIG. 1b can be configured like the data storage node 112 of FIG. 1c. As shown in FIG. 1c, the data storage node 112 can include a communications interface 116, storage processing circuitry 118, and a memory 120. The communications interface 108 can include SCSI target adapters, network interface adapters, and/or any other suitable adapters for converting electronic, wireless, and/or optical signals received over the network 106 to a form suitable for use by the storage processing circuitry 118. The memory 120 can include persistent memory (e.g., flash memory, magnetic memory) and non-persistent cache memory (e.g., dynamic random access memory (DRAM), static random access memory (SRAM)), and can accommodate a variety of specialized software constructs, including, but not limited to, namespace management code and data (also referred to herein as the "namespace manager"; see reference numeral 126) and mapping management code and data (also referred to herein as the "mapping manager"; see reference numeral 128).

The namespace manager 126 can be configured to maintain a namespace of storage objects, such as volumes (e.g., VVOLs, LUNs), file systems, and/or any other suitable storage objects, accessible to the plurality of host computers 102.1, ..., 102.n. In general, a namespace is a point-in-time (PIT) logical collection of such storage objects, each of which can be represented by an index node (also referred to herein as an "inode"). In one embodiment, the namespace maintained by the namespace manager 126 can include a set of storage objects (e.g., VVOLs) organized as a collection of inodes. For example, each such VVOL may be made up of one or more extents, each of which may correspond to a range of storage sizes (e.g., 1 megabyte (Mb), 4 Mbs) in a logical address space. Further, the range of storage sizes may correspond to a range of contiguous or noncontiguous logical addresses spanning some or all of the VVOL.

The mapping manager 128 can be configured to map extents of volumes (e.g., VVOLs, LUNs) to corresponding redundant array of independent disk (RAID) addresses, which, in turn, can be mapped to corresponding drive locations in one or more underlying storage units 114, such as magnetic disk drives, electronic flash drives, and/or any other suitable storage drives. The storage unit(s) 114 can be configured to store storage objects 122 such as volumes (e.g., VVOLs), file systems, and/or any other suitable storage objects, as well as metadata 124 such as a namespace superblock 130, a mapper superblock 132, one or more VLB pages 134, and one or more bookkeeping data structures 136, each of which can be employed in the techniques disclosed herein. It is noted that the storage unit(s) 114 can be locally attached to an IO channel of the data storage node 112, while also being accessible over the network 106. It is further noted that the storage unit(s) 114 can be implemented as a system of storage drives or devices, such as a collection of drives (e.g., a RAID group). In one embodiment, the storage unit(s) 114 can be implemented as a dual-ported drive, which can be shared between the data storage node (primary) 112.1 and the data storage node (secondary) 112.2 of the data storage appliance 108.

The storage processing circuitry 118 can include one or more physical storage processors or engines running specialized software, data movers, director boards, blades, IO modules, storage drive controllers, switches, and/or any other suitable computer hardware or combination thereof. In one embodiment, the storage processing circuitry 118 can process storage IO requests provided by the respective host computers 102.1, ..., 102.n over the communications medium 103, and store host data in a RAID environment implemented by the storage unit(s) 114.

In the context of the storage processing circuitry 118 being implemented using one or more processors running specialized software, a computer program product can be configured to deliver all or a portion of the software constructs to the respective processor(s). Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. The non-transient computer-readable storage media can be encoded with sets of instructions that, when executed by the respective processor(s), perform the techniques disclosed herein. For example, such media may be considered to be articles of manufacture, and may be transportable from one data storage appliance to another data storage appliance.

During operation, the data storage node 112 (see FIG. 1c) included in the data storage appliance 108 (see FIG. 1b) can perform recovery (i.e., checking and fixing) of space accounting metadata (including counters) of data volumes and/or volume families stored on the storage unit(s) 114. Each volume family can include at least one branch, and each branch can include one or more child volumes (e.g., snapshot volumes) that are sequential copies of a parent volume. The data storage node 112 can perform such recovery of space accounting metadata of data volumes and/or volume families while remaining online, allowing users of the data storage appliance 108 full or at least partial access to their stored data while space accounting metadata recovery activities are in progress. The data storage node 112 can reestablish a plurality of counters for tracking amounts of physical storage space that are committed and/or unique to the data volumes and/or volume families, including (i) a first counter that can track a first amount of physical storage space (referred to herein as the "VolumeCommittedCount") that is committed to each data volume in each branch of a respective volume family, (ii) a second counter that can track an amount of physical storage space (referred to herein as the "FamilyCommittedCount") that is committed to a respective volume family, and (iii) a third counter that can track an amount of physical storage space (referred to herein as the "FamilyUniqueCount") that is unique to (or unshared by) a respective volume family.

The data storage node 112 can also, while reestablishing the respective counters, conduct a tree walk through a mapping hierarchy of each data volume and/or volume family, marking a starting point and an ending point for the tree walk through the mapping hierarchy, and monitoring a logical offset from the starting point during the tree walk. Upon receipt of a storage input/output (IO) request, the data storage node 112 can determine whether or not the storage IO request and the space accounting metadata recovery activities are attempting to access the same region of metadata, based on the logical offset relative to the starting point and/or ending point of the tree walk. Based on the result of the determination, the data storage node 112 can update the VolumeCommittedCount, the FamilyCommittedCount, and/or the FamilyUniqueCount, and/or temporary "bookkeeping" versions of the VolumeCommittedCount, the FamilyCommittedCount, and/or the FamilyUniqueCount maintained in the bookkeeping data structure(s) 136, as appropriate. By performing recovery of space accounting metadata of data volumes and/or volume families while online, the data storage node 112 can address and/or repair metadata inconsistencies while still allowing users of the data storage appliance 108 full or at least partial access to their stored data.

Figure 2:
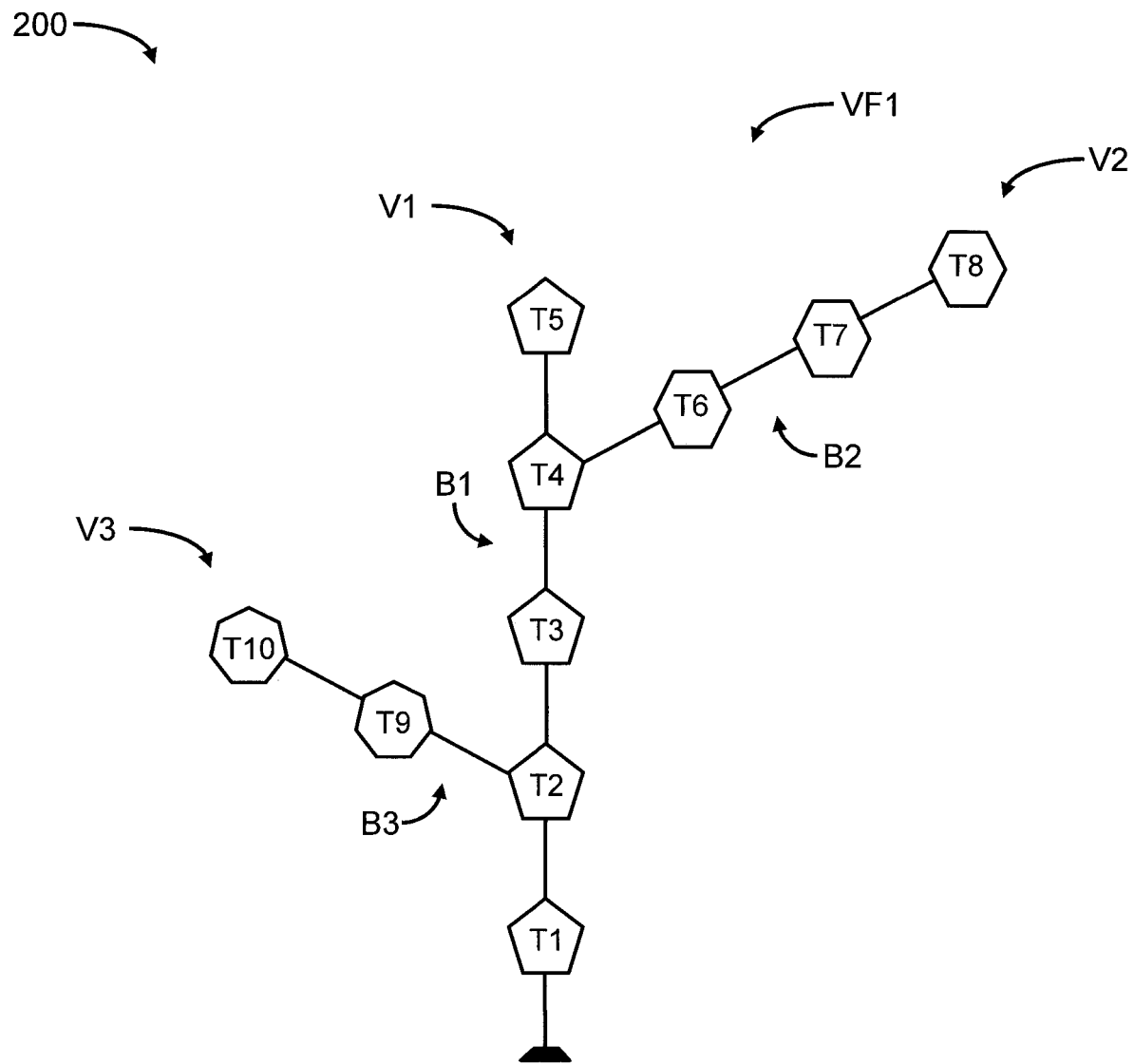
FIG. 2 is a block diagram of an exemplary volume family including a plurality of branches, each of which includes a sequence of data volumes.

FIG. 2 depicts an acyclic graph 200 representing an exemplary volume family VF1. The volume family VF1 includes a plurality of branches B1, B2, B3, each of which includes one or more read-only snapshot volumes that are sequential copies of a writable parent volume. As shown in FIG. 2, the branch B1 includes a plurality of snapshot volumes T1, T2, T3, T4, which are sequential point-in-time (PIT) copies of a parent volume T5 (also referred to herein as the "primary volume"). The branch B2 includes a plurality of snapshot volumes T6, T7, which are sequential PIT copies of a parent volume T8 (also referred to herein as a "clone volume"). The branch B3 includes a single snapshot volume T9, which is a PIT copy of a parent volume T10 (also referred to herein as a "clone volume"). It is noted that the volumes T1, T2, T3, T4, T5 in the branch B1 may each correspond to a version of a volume V1, the volumes T6, T7, T8 in the branch B2 may each correspond to a version of a volume V2, and the volumes T9, T10 in the branch B3 may each correspond to a version of a volume V3.

In general, an acyclic graph representing a volume family (such as the acyclic graph 200 representing the volume family VF1; see FIG. 2) can be constructed by assigning a volume identifier (ID) to a newly created primary volume, and, over time, assigning monotonically increasing volume IDs to the primary volume and one or more sequential snapshot copies of the primary volume to form a first branch of the volume family (as illustrated in FIG. 2 by the monotonically increasing tag designations T1, T2, T3, T4 of the four (4) snapshot volumes and T5 of the single primary volume in the branch B1 of the volume family VF1). It is noted that the writable primary volume (e.g., the primary volume T5; see FIG. 2) is assigned the latest volume ID in the first branch (e.g., the branch B1; see FIG. 2) of the volume family (e.g., the volume family VF1; see FIG. 2). In other words, if a snapshot volume is created based on a primary volume of a volume family, then the snapshot volume is assigned the current latest volume ID in a first branch of the volume family, while the primary volume is assigned a new latest volume ID in the first branch of the volume family.

Having obtained at least part of the first branch of the volume family, a writable clone volume can be created based on a selected snapshot volume in the first branch. With reference to the acyclic graph 200 representing the volume family VF1 (see FIG. 2), it is understood that an initial version of the clone volume T8 in the branch B2 was created based on the snapshot volume T4 in the branch B1. Similarly, an initial version of the clone volume T10 in the branch B3 was created based on the snapshot volume T2 in the branch B1. Like the primary volume (e.g., the primary volume T5; see FIG. 2) in the first branch of the volume family described hereinabove, each clone volume (e.g., the clone volume T8 or T10; see FIG. 2) is assigned the latest volume ID in a new branch (e.g., the branch B2 or B3; see FIG. 2) of the volume family. In other words, if a snapshot volume is created based on a clone volume in a new branch of a volume family, then the snapshot volume is assigned the current latest volume ID in the new branch of the volume family, while the clone volume is assigned a new latest volume ID in the new branch of the volume family. It is noted that the first branch and subsequent new branches of a volume family are assigned monotonically increasing branch IDs (as illustrated in FIG. 2 by the monotonically increasing tag designations B1, B2, B3 of the three (3) branches in the volume family VF1). Further, each branch of a volume family has a corresponding branch root volume.

To facilitate the space accounting metadata recovery activities performed by the data storage node 112 (see FIG. 1c), the data storage node 112 can assign, to each data volume in a volume family, (i) a corresponding volume family ID ("Family ID"), (ii) a corresponding branch ID ("Branch ID"), and (iii) a corresponding volume ID ("Volume ID"). In one embodiment, the namespace manager 126 (see FIG. 1c) can be configured to maintain a Family ID, a Branch ID, and a Volume ID for each data volume in a volume family stored in association with the data storage node 112. As described herein, the namespace maintained by the namespace manager 126 can include a set of storage objects (e.g., VVOLs) organized as a collection of inodes. Such a collection of inodes can be organized with associated namespace metadata, including a namespace inode that can be configured to store information regarding the collection of inodes (including the Family ID, the Branch ID, and the Volume ID for each data volume in a volume family) in an inode file.

Figure 3:
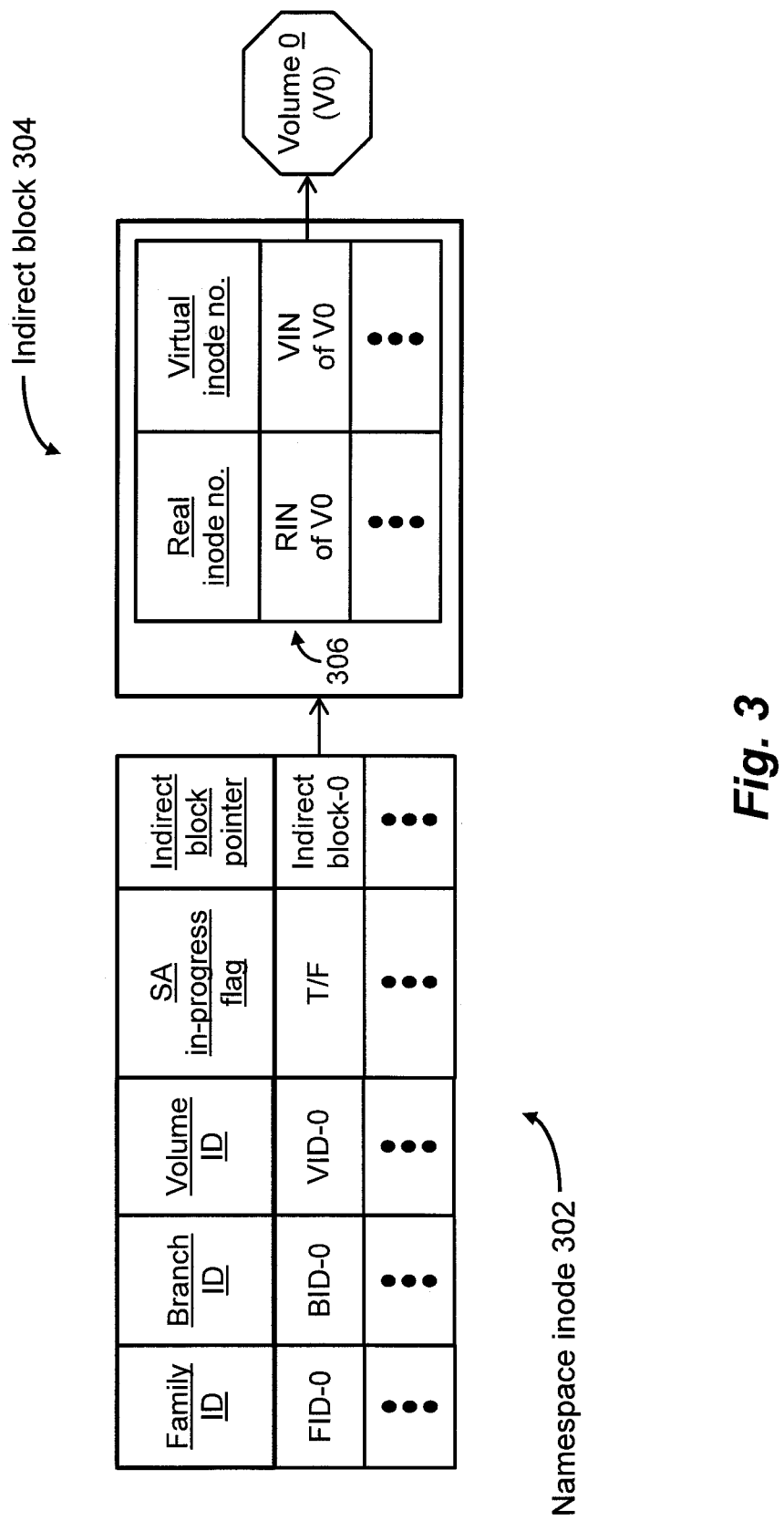
FIG. 3 is a block diagram of an exemplary namespace index node (Mode) configured to include a volume family identifier (ID), a branch ID, and a volume ID for each data volume in a volume family.

FIG. 3 depicts an exemplary namespace inode 302 that can be maintained by the namespace manager 126 of the data storage node 112. As shown in FIG. 3, the namespace inode 302 can be configured to store a Family ID, a Branch ID, and a Volume ID for one or more data volumes stored in association with the data storage node 112. For example, for an exemplary data volume "V0" ("Volume 0") in a volume family, the namespace inode 302 may store a Family ID, "FID-0," a Branch ID, "BID-0," and a Volume ID, "VID-0." The namespace inode 302 can be further configured to store, for specific data volumes, a space accounting (SA) in-progress flag (T/F), and an indirect block pointer, "Indirect block-0," which points to an indirect block 304. The indirect block 304 can be configured to store information pertaining to the set of volumes included in the namespace maintained by the namespace manager 126. For example, the stored information may include an entry 306 that stores information pertaining to the Volume 0, including a real inode number ("RN") for the Volume 0, as well as a virtual inode number ("VIN") for the Volume 0. It is further noted that, while the storage processing circuitry 118 services a storage IO request from one of the host computers 102.1, ..., 102.n for reading/writing a data page "0" from/to the Volume 0, the namespace manager 126 can incorporate the appropriate Family ID, Branch ID, and Volume ID into the storage IO request before it is forwarded along a write path to the mapping manager 128.

To further facilitate the space accounting metadata recovery activities performed by the data storage node 112 (see FIG. 1c), the data storage node 112 can maintain an owner volume ID for each data page of a data volume stored in association with the data storage node 112. As employed herein, the owner volume ID provides, for each data page, an indication of the data volume to which the data page was last written. In one embodiment, for each data page, the owner volume ID can be stored in a corresponding leaf page at a leaf level of a mapping hierarchy, which can be maintained by the mapping manager 128.

Figure 4:
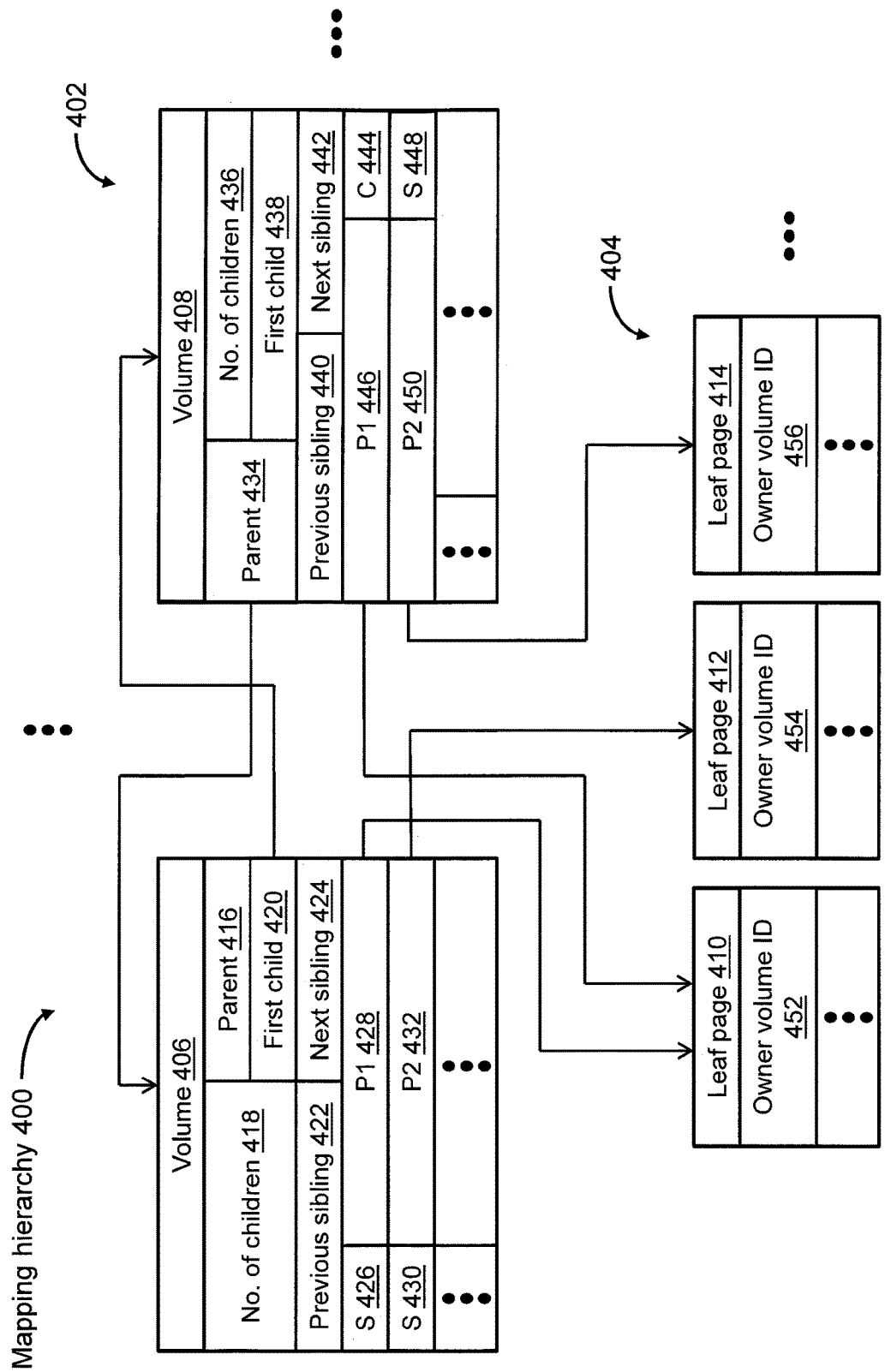
FIG. 4 is a block diagram of an exemplary mapping hierarchy for a plurality of exemplary data volumes in a volume family.

FIG. 4 depicts an exemplary mapping hierarchy 400 for a plurality of data volumes (such as a volume 406 and a volume 408) in a volume family. As shown in FIG. 4, the mapping hierarchy 400 can be configured as a multi-level tree (e.g., a B+ tree) that includes at least a volume level 402 and a leaf level 404. The volume level 402 can have nodes corresponding to at least the volume 406 and the volume 408, and the leaf level 404 can have nodes corresponding to at least a leaf page 410, a leaf page 412, and a leaf page 414. It is noted, however, that the multi-level tree of the mapping hierarchy 400 can include many more levels than the two levels 402, 404. For example, the multi-level tree may include a multitude of volume levels above the volume level 402.

As shown in FIG. 4, the node corresponding to the volume 406 can include information, attributes, or metadata corresponding to a parent 416, a number of children 418, a first child 420, a previous sibling 422, and a next sibling 424. Likewise, the node corresponding to the volume 408 can include information, attributes, or metadata corresponding to a parent 434, a number of children 436, a first child 438, a previous sibling 440, and a next sibling 442. The parent attributes 416, 434 correspond to pointers to locations of parent volumes of the respective volumes 406, 408, if any. For example, the parent attribute 434 of the volume 408 may point to a location of the volume 406, which may be the parent volume of the volume 408. The number of children attributes 418, 436 provide indications of the number of child volumes of the respective volumes 406, 408, if any. The first child attributes 420, 438 correspond to pointers to locations of first child volumes of the respective volumes 406, 408, if any. For example, the first child attribute 420 of the volume 406 may point to a location of the volume 408, which may be the first child volume (e.g., snapshot volume) of the volume 406. It is noted that, once the first child volumes of the volumes 406, 408 are located, additional child volumes of the respective volumes 406, 408 may be located by following associated previous and/or next sibling pointers. The previous sibling attributes 422, 440 correspond to pointers to locations of previous sibling volumes for child volumes of the respective volumes 406, 408, if any. The next sibling attributes 424, 442 correspond to pointers to locations of next sibling volumes for child volumes of the respective volumes 406, 408, if any. As described herein, the owner volume ID for each data page of a data volume can be stored in a corresponding leaf page (such as the leaf page 410, 412, or 414; see FIG. 4) at the leaf level 404 of the mapping hierarchy 400. The leaf page 410 can include an attribute or metadata corresponding to an owner volume ID 452. Likewise, the leaf page 412 can include an attribute corresponding to an owner volume ID 454, and the leaf page 414 can include an attribute or metadata corresponding to an owner volume ID 456.

As further shown in FIG. 4, the node corresponding to the volume 406 can further include leaf pointers (such as a leaf pointer P1 428 and a leaf pointer P2 432) to locations of the leaf page 410, the leaf page 412, and/or the leaf page 414. For example, the leaf pointer P1 428 may point to a location of the leaf page 410, and the leaf pointer P2 432 may point to a location of the leaf page 412. Likewise, the node corresponding to the volume 408 can further include leaf pointers (such as a leaf pointer P1 446 and a leaf pointer P2 450) to locations of the leaf page 410, the leaf page 412, and/or the leaf page 414. For example, the leaf pointer P1 446 may point to a location of the leaf page 410, and the leaf pointer P2 450 may point to a location of the leaf page 414. In addition, each of the leaf pointer P1 428, the leaf pointer P2 432, the leaf pointer P1 446, and the leaf pointer P2 450 can include a source ("S") attribute or a copy ("C") attribute. For example, the leaf pointer P1 428 may include a source (S) attribute 426, which indicates that the volume 406 is the source of a data page (e.g., 4 kilobytes (kb)) corresponding to the leaf page 410; and, the leaf pointer P2 432 may include a source (S) attribute 430, which indicates that the volume 406 is the source of a data page corresponding to the leaf page 412. Further, the leaf pointer P1 446 may include a copy (C) attribute 444, which indicates that the volume 406 shares a copy of the data page corresponding to the leaf page 410 with the volume 408; and, the leaf pointer P2 450 may include a source (S) attribute 448, which indicates that the volume 408 is the source of a data page corresponding to the leaf page 414. It is noted that each of the leaf pages 410, 412, and 414 can further include pointers (not shown) to their respective corresponding data pages. It is further noted that the various information, attributes, metadata, and/or pointers contained in the mapping hierarchy 400, which can describe mappings between physical blocks, virtual blocks, and/or logical blocks, are also referred to herein collectively as the "mapping metadata."

As described herein, the space accounting metadata recovery activities performed by the data storage node 112 can include maintaining (i) a first counter that can track a first amount of physical storage space (the "VolumeCommittedCount") committed to each data volume in each branch of a respective volume family, (ii) a second counter that can track an amount of physical storage space (the "FamilyCommittedCount") committed to a respective volume family, and (iii) a third counter that can track an amount of physical storage space (the "FamilyUniqueCount") unique to (or unshared by) a respective volume family.

Figure 5A:
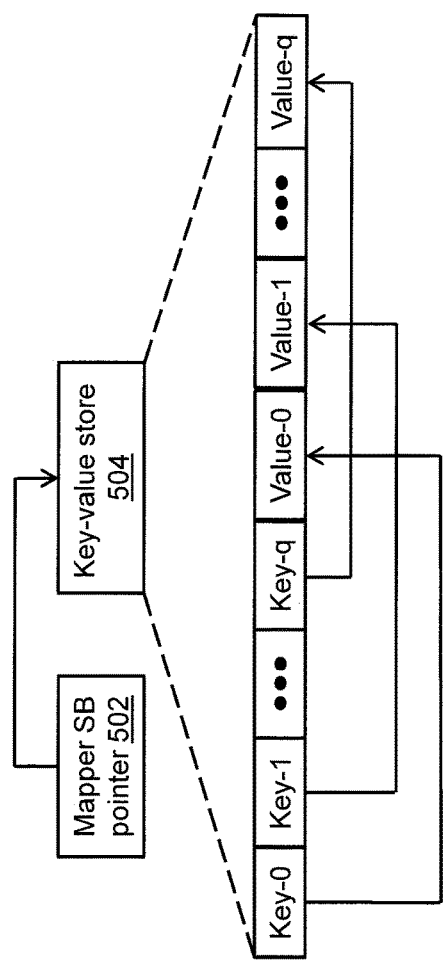
FIG. 5a is a block diagram of an exemplary first key-value store for storing a plurality of first key-value pairs, each key in a first key-value pair including a volume family ID, a branch ID, and a volume ID, and each value in the first key-value pair providing an indication of an amount of physical storage space (the "VolumeCommittedCount") committed to a respective data volume in a respective branch of a respective volume family.
Figure 5B:
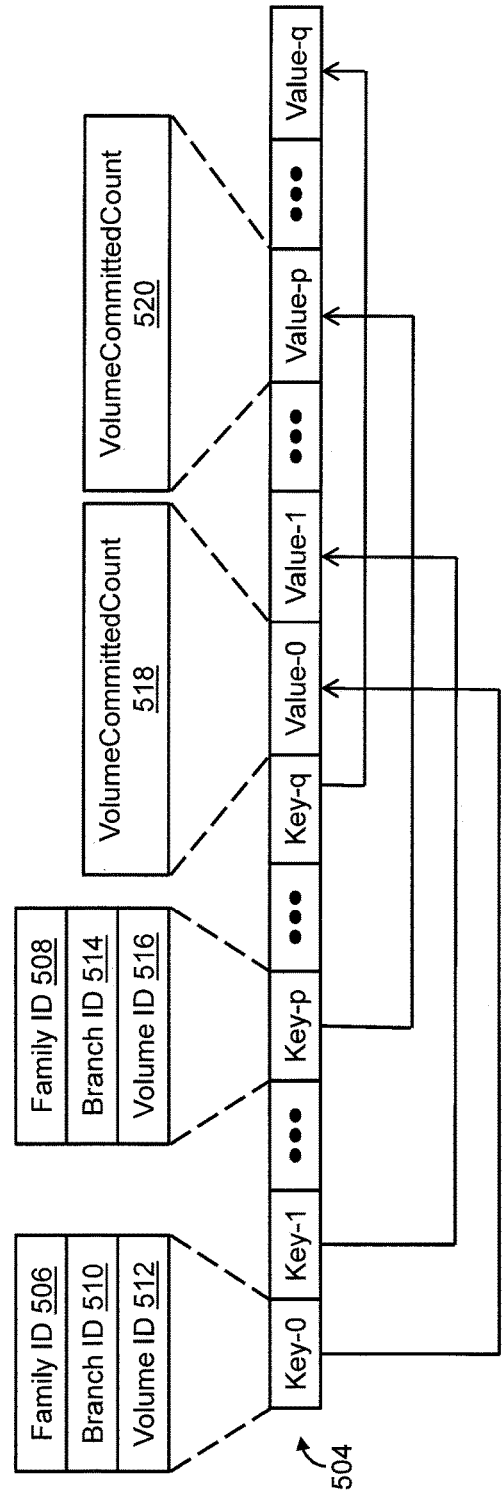

In one embodiment, the mapping manager 128 can maintain, for each data volume in each branch of a respective volume family, the VolumeCommittedCount in a key-value store 504, as illustrated in FIGS. 5a and 5b. As shown in FIG. 5a, the mapping superblock (SB) 132 can contain a pointer 502 (the "mapper SB pointer") to the key-value store 504. Further, as shown in FIGS. 5a and 5b, the key-value store 504 can include a plurality of keys 0, 1, . . . , p, . . . , q that point to or are otherwise paired with a plurality of values 0, 1, . . . , p, . . . , q, respectively. In one embodiment, the "key" in a key-value pair can be implemented by a Family ID, a Branch ID, and a Volume ID of a data volume, while the "value" in the key-value pair can include the VolumeCommittedCount. For example, the key-0 (see FIG. 5b) of a $0^{th}$ key-value pair may be implemented by the Family ID 506, a Branch ID 510, and a Volume ID 512 of a volume in a branch of a respective volume family, while the value-0 (see also FIG. 5b) of the $0^{th}$ key-value pair may include a VolumeCommittedCount 518 of the volume in the branch of the respective volume family. Likewise, the key-p (see FIG. 5b) of an $p^{th}$ key-value pair may be implemented by the Family ID 508, a Branch ID 514, and a Volume ID 516 of a volume in a branch of a respective volume family, while the value-0 (see also FIG. 5b) of the $p^{th}$ key-value pair may include a VolumeCommittedCount 520 of the volume in the branch of the respective volume family.

Figure 5C:
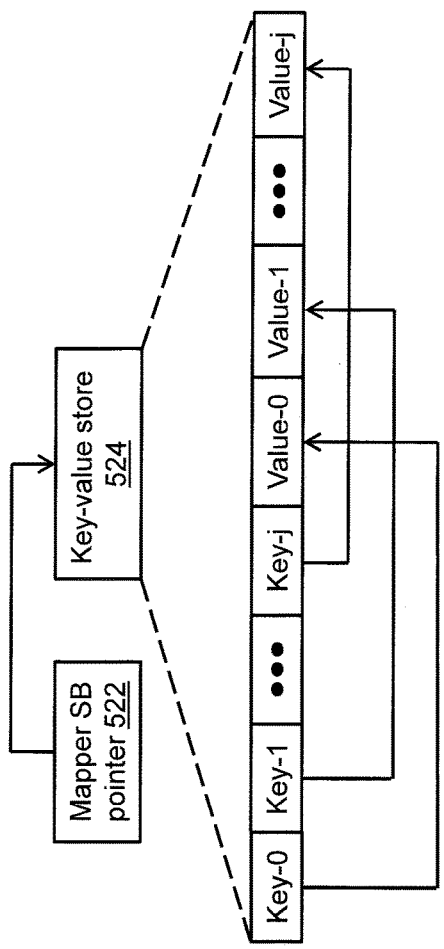
FIG. 5c is a block diagram of an exemplary second key-value store for storing a plurality of second key-value pairs, each key in a second key-value pair including a volume family ID, and each value in the second key-value pair providing indications of an amount of physical storage space (the "FamilyCommittedCount") committed to a respective volume family, and an amount of physical storage space (the "FamilyUniqueCount") unique to (or unshared by) the respective volume family.
Figure 5D:
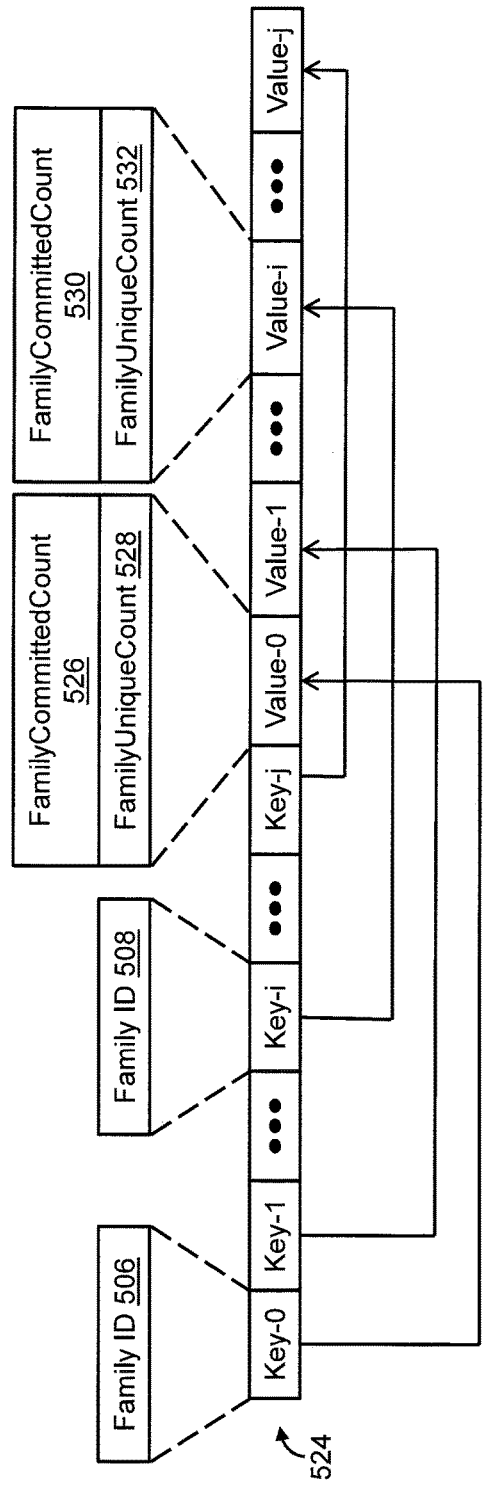
FIG. 5d is a block diagram of a detailed view of the second key-value store of FIG. 5c.

In one embodiment, the mapping manager 128 can further maintain, for each volume family, both the FamilyCommittedCount and the FamilyUniqueCount in a key-value store 524, as illustrated in FIGS. 5c and 5d. As shown in FIG. 5c, the mapping superblock (SB) 132 can further contain a pointer 522 (the "mapper SB pointer") to the key-value store 524. Further, as shown in FIGS. 5c and 5d, the key-value store 524 can include a plurality of keys 0, 1, . . . , i, . . . , j that point to or are otherwise paired with a plurality of values 0, 1, . . . , i, . . . , j, respectively. In one embodiment, the "key" in a key-value pair can be implemented by a Family ID of a volume family, while the "value" in the key-value pair can include both the FamilyCommittedCount and the FamilyUniqueCount. For example, the key-0 (see FIG. 5d) of a $0^{th}$ key-value pair may be implemented by the Family ID 506 of the respective volume family, while the value-0 (see also FIG. 5d) of the $0^{th}$ key-value pair may include a FamilyCommittedCount 526 and a FamilyUniqueCount 528 of the respective volume family. Likewise, the key-i (see FIG. 5d) of an $i^{th}$ key-value pair may be implemented by the Family ID 508 of the respective volume family, while the value-i (see also FIG. 5d) of the $i^{th}$ key-value pair may include a FamilyCommittedCount 530 and a FamilyUniqueCount 532 of the respective volume family.

The disclosed techniques for performing recovery (i.e., checking and fixing) of space accounting metadata (including counters) while a data storage system is online for regular user data access will be further understood with reference to the following illustrative example, as well as the volume family VF1 illustrated in FIG. 2. In this example, it is assumed that a file system checking (FSCK) utility has been executed or run, in an offline process, on the data storage node 112 to address and/or repair inconsistencies in the mapping metadata contained in the mapping hierarchy 400. It is noted, however, that the disclosed techniques can be performed as a planned invocation of online space accounting metadata recovery activities, without first having executed the FSCK utility.

Having executed the FSCK utility in an offline process, the data storage node 112 is brought back online, allowing the data storage node 112 to service storage IO requests (e.g., read requests, write requests) received from the host computers 102.1, . . . , 102.n. Further, while online, the data storage node 112 performs recovery of space accounting metadata of one or more data volumes and/or volume families stored on the storage unit(s) 114. To that end, the data storage node 112 first performs recovery of space accounting metadata to address and/or repair a detected discrepancy in the VolumeCommittedCount for an exemplary specific data volume. For example, the specific data volume may be part of the volume family VF1, and may be assigned Family ID 506, Branch ID 510, and Volume ID 512. Further, the VolumeCommittedCount for the specific data volume, for which a discrepancy has been detected, may be maintained in the key-value store 504 as the VolumeCommittedCount 518.

Having detected the discrepancy in the VolumeCommittedCount 518 for the specific data volume, the data storage node 112 sets a starting point and an ending point for a tree walk through the mapping hierarchy 400 to verify the space accounting metadata for the respective volume. Further, the data storage node 112 stores indications of the starting and ending points in the namespace superblock 130. It is noted that, upon receipt of a storage IO request while performing online space accounting metadata recovery activities, the data storage node 112 can check for any indications of such starting and ending points in the namespace superblock 130 to confirm that the space accounting metadata recovery activities are in-progress, and to subsequently service the storage IO request in an appropriate manner. Once the starting point and the ending point corresponding to the tree walk for the specific data volume are set, the data storage node 112 sets the space accounting (SA) in-progress flag for the specific data volume to "true" (SA in-progress flag, T/F, in namespace inode 302; see FIG. 3), sets each step or increment of a logical offset from the starting point for the tree walk to a predetermined value (such as 2 megabytes (Mb) or any other suitable value), and stores the step or increment of the logical offset in the bookkeeping data structure 136. In addition, the data storage node 112 creates, in the bookkeeping data structure 136, a temporary key-value store like the key-value store 504, but configured for storing a newly calculated VolumeCommittedCount for the specific data volume.

Now that on-line space accounting metadata recovery activities are in-progress, as indicated by the settings of the starting and ending points in the namespace superblock 130 and the SA in-progress flag in the namespace inode 302, the data storage node 112 performs a tree walk through the mapping hierarchy 400 for the specific data volume from the starting point to the ending point, beginning at a logical offset equal to "0." It is noted that an indication of the logical offset for the tree walk is updated at intervals in the bookkeeping data structure 136 based on the stored step or increment setting, e.g., at each 2 Mb step or increment of the tree walk. While performing the tree walk through the mapping hierarchy 400 for the specific data volume, the data storage node 112 maintains a count of the source (S) attributes (e.g., the source (S) attributes 426, 430; see FIG. 4), each of which indicates that the specific data volume is the source of a data page pointed to by a corresponding leaf page. Further, the data storage node 112 updates the VolumeCommittedCount for the specific data volume in the temporary key-value store created in the bookkeeping data structure 136, based on the count of the source (S) attributes in the mapping metadata for the specific data volume.

Upon receipt of a storage IO request (e.g., read request, write request), the data storage node 112 checks the indications of the starting and ending points of online space accounting metadata recovery activities stored in the namespace superblock 130 to confirm that such space accounting metadata recovery activities are in-progress. Further, the data storage node 112 checks the SA in-progress flag for the specific data volume stored in the namespace Mode 302, and discovers that the SA in-progress flag for the specific data volume is set to "true." In addition, the data storage node 112 checks a current logical offset from the starting point for the tree walk stored in the bookkeeping data structure 136, and determines, based on the current logical offset, whether the space accounting metadata recovery activities and the storage IO request are accessing (or attempting to access) the same region of metadata. In one embodiment, if the space accounting metadata recovery activities are accessing the same region of metadata as the storage IO request, then any queries of the VolumeCommittedCount for the specific data volume can be serviced from the key-value store 504 to assure prompt access to the volume data. Further, if any errors are detected relating to the VolumeCommittedCount at the time of servicing the storage IO request, then such errors can be reported as appropriate. If, based on the current logical offset, it is determined that the space accounting metadata recovery activities have proceeded past the region of metadata being accessed by the storage IO request, then the VolumeCommittedCount for the specific data volume can be updated, as required, in both the temporary key-value store in the bookkeeping data structure 136 and in the key-value store 504. If, based on the current logical offset, it is determined that the space accounting metadata recovery activities have not proceeded past the region of metadata being accessed by the storage IO request, then the VolumeCommittedCount for the specific data volume can be updated, as required, in the key-value store 504.

Once the space accounting metadata recovery activities for addressing and/or repairing the detected discrepancy in the VolumeCommittedCount for the specific data volume have completed (e.g., the logical offset has reached the ending point for the tree walk), the temporary key-value store in the bookkeeping data structure 136 can replace the key-value store 504, the mapper SB pointer 502 can be modified to point to the key-value store replacing the key-value store 504, the indications of the starting and ending points in the namespace superblock 130 can be cleared, the SA in-progress flag for the specific data volume can be set to "false" (SA in-progress flag, T/F, in namespace inode 302; see FIG. 3), and the prior key-value store 504 can be discarded.

Having addressed and/or repaired the detected discrepancy in the VolumeCommittedCount for the specific data volume, the data storage node 112 can further perform recovery of space accounting metadata to address and/or repair one or more detected discrepancies in the FamilyCommittedCount and/or the FamilyUniqueCount for the volume family VF1. For example, the volume family VF1 may be assigned Family ID 506, and the FamilyCommittedCount and the FamilyUniqueCount for the volume family VF1 may each be maintained in the key-value store 524 as the FamilyCommittedCount 526 and the FamilyUniqueCount 528, respectively.

Having detected the discrepancies in the FamilyCommittedCount 526 and/or the FamilyUniqueCount 528 for the volume family VF1, the data storage node 112 sets a starting point and an ending point for a tree walk through the mapping hierarchy 400 to verify the space accounting metadata for the volume family VF1. Further, the data storage node 112 stores indications of the starting and ending points in the namespace superblock 130. It is noted that, upon receipt of a storage IO request while performing online space accounting metadata recovery activities, the data storage node 112 can check for any indications of such starting and ending points in the namespace superblock 130 to confirm that space accounting metadata recovery activities are in-progress, and to subsequently service the storage IO request in an appropriate manner. Once the starting point and the ending point corresponding to the tree walk for the volume family VF1 are set, the data storage node 112 sets each step or increment of a logical offset from the starting point for the tree walk to a predetermined value (e.g., 2 Mb or any other suitable value), and stores the step or increment of the logical offset in the bookkeeping data structure 136. Further, as the space accounting metadata is verified for each respective data volume in the volume family VF1 (as described hereinabove for the exemplary specific data volume), the data storage node 112 sets the SA in-progress flag for the respective data volume to "true" (SA in-progress flag, T/F, in namespace inode 302; see FIG. 3). In addition, the data storage node 112 creates, in the bookkeeping data structure 136, a temporary key-value store like the key-value store 524, but configured for storing a newly calculated FamilyCommittedCount, as well as a newly calculated FamilyUniqueCount, for the volume family VF1.

It is noted that the FamilyUniqueCount for the volume family VF1 corresponds to the amount of physical storage space that would be freed if the volume family VF1 were deleted. The amount of physical storage space allocated to the respective data volumes in the volume family VF1 is deemed to be unique to the volume family VF1, so long as a deduplication domain for each deduplicated data page written to the respective data volumes consists of data segments within the volume family VF1. Such deduplication of a data page can cause one or more data segments of the data page to be shared among different logical addresses within the same data volume or across different data volumes. For example, each such data segment embodied as a data block may maintain a reference count to indicate a number of times that the data block is shared. Further, a reference count equal to "0" may indicate that the data block is not in use and may be reclaimed, a reference count equal to "1" may indicate that the data block is in use but not shared, and a reference count greater than "1" may indicate that the data block is in use and shared within a single data volume or between different data volumes. Indications of such reference counts relating to data block sharing within the volume family VF1 can be stored in the VLB pages 134 for the volume family VF1, and can be considered as part of the metadata for the volume family VF1. In addition, during verification of the space accounting metadata for the volume family VF1, the data storage node 112 creates, in the bookkeeping data structure 136, temporary VLB pages like the VLB pages 134, but configured for storing newly calculated reference counts for the volume family VF1.

Upon receipt of a storage IO request (e.g., read request, write request), the data storage node 112 checks the indications of the starting and ending points of online space accounting metadata recovery activities stored in the namespace superblock 130 to confirm that such space accounting metadata recovery activities are in-progress. Further, the data storage node 112 checks the SA in-progress flag for each respective data volume stored in the namespace Mode 302, as well as a current logical offset from the starting point for the tree walk stored in the bookkeeping data structure 136 to determine, based on the current logical offset, whether the space accounting metadata recovery activities are accessing the same region of metadata as the storage IO request, as described hereinabove. In addition, the data storage node 112 determines whether the storage IO request might change any metadata (e.g., the reference counts) stored in the VLB pages 134 for the volume family VF1. If it is determined that the storage IO request might change at least some of the metadata (e.g., the reference counts) stored in the VLB pages 134, then such metadata can be updated, as required, in both the temporary VLB pages in the bookkeeping data structure 136 and in the VLB pages 134.

Once the space accounting metadata recovery activities for addressing and/or repairing the detected discrepancies in the FamilyCommittedCount 526 and/or the FamilyUniqueCount 528 for the volume family VF1 have completed (e.g., the logical offset has reached the ending point for the tree walk), the temporary key-value store in the bookkeeping data structure 136 can replace the key-value store 524, the mapper SB pointer 522 can be modified to point to the key-value store replacing the key-value store 524, the indications of the starting and ending points in the namespace superblock 130 can be cleared, all of the SA in-progress flags for the respective data volumes in the volume family VF1 can be set to "false" (SA in-progress flag, T/F, in namespace Mode 302; see FIG. 3), and the prior key-value store 524 can be discarded.

Figure 6:
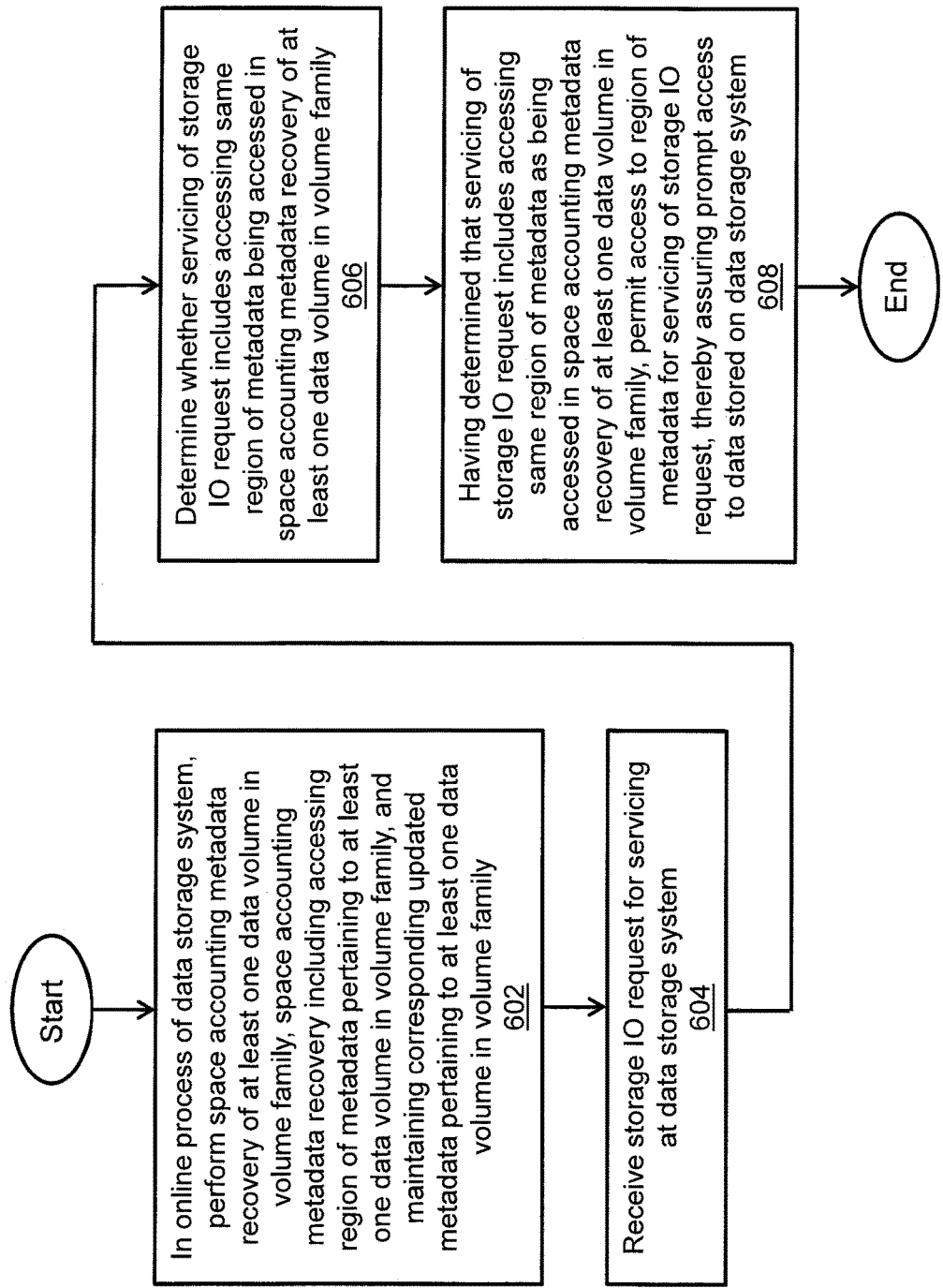
FIG. 6 is a flow diagram of an exemplary method of performing recovery of space accounting metadata while a data storage system is online for regular user data access.

An exemplary method of performing recovery of space accounting metadata while a data storage system is online for regular user data access is described below with reference to FIG. 6. As depicted in block 602, in an online process of the data storage system, space accounting metadata recovery of at least one data volume in a volume family is performed, in which the space accounting metadata recovery includes accessing a region of metadata pertaining to the at least one data volume in the volume family, and maintaining corresponding updated metadata pertaining to the at least one data volume in the volume family. As depicted in block 604, a storage IO request is received for servicing at the data storage system. As depicted in block 606, a determination is made as to whether the servicing of the storage IO request includes accessing the same region of metadata being accessed in the space accounting metadata recovery of the at least one data volume in the volume family. As depicted in block 608, having determined that the servicing of the storage IO request includes accessing the same region of metadata as being accessed in the space accounting metadata recovery of the at least one data volume in the volume family, access to the region of metadata is permitted for servicing of the storage IO request, thereby assuring prompt access to data stored on the data storage system.

Having described the foregoing illustrative embodiments, other embodiments and/or variations may be made and/or practiced. For example, it was described herein that the clustered storage environment 100 of FIG. 1 can include the plurality of host computers 102.1, 102.2, ..., 102.n and the storage domain 104 interconnected by the network 106, and that the disclosed techniques can be used to determine (i) an amount of physical storage space committed to each data volume in each branch of a respective volume family, (ii) an amount of physical storage space committed to a respective volume family, and (iii) an amount of physical storage space unique to (or unshared by) a respective volume family. In one embodiment, such information pertaining to committed and/or unique physical storage space for volumes and/or volume families can be used to perform data storage activities (such as data storage recovery and/or data migration) more efficiently among the respective data storage appliances 108.1, ..., 108.m within the storage domain 104 of the clustered storage environment 100.

While various embodiments of the disclosure have been particularly shown and described, it will be understood by those skilled in the art that various changes in form and details may be made therein without departing from the scope of the disclosure as defined by the appended claims.

What is claimed is:
1. A method of performing recovery of space accounting metadata while a data storage system is online for regular user data access, comprising:
in an online process, performing recovery of space accounting metadata of at least one data volume in a volume family, the performing of the recovery of space accounting metadata including:
accessing a region of metadata pertaining to the at least one data volume in the volume family;
maintaining corresponding metadata pertaining to the at least one data volume in the volume family;
detecting a discrepancy in an amount of physical storage space committed to a respective data volume in a branch of the volume family;
setting a starting point and an ending point for a tree walk through a mapping hierarchy to verify space accounting metadata for the respective data volume, the space accounting metadata corresponding to a first count representative of the amount of physical storage space committed to the respective data volume;
maintaining corresponding space accounting metadata for the respective data volume, the maintained corresponding space accounting metadata corresponding to a newly calculated count representative of the amount of physical storage space committed to the respective data volume; and
performing the tree walk through the mapping hierarchy for the respective data volume from the starting point to the ending point;
receiving a storage IO request for servicing at the data storage system;
upon receipt of the storage IO request, checking a current logical offset from the starting point for the tree walk;
determining whether the servicing of the storage IO request includes accessing the same region of metadata being accessed in the recovery of space accounting metadata of the at least one data volume in the volume family based on the current logical offset; and
having determined that the servicing of the storage IO request includes accessing the same region of metadata as being accessed in the recovery of space accounting metadata of the at least one data volume in the volume family based on the current logical offset, permitting access to the region of metadata for servicing of the storage IO request, thereby assuring prompt access to data stored on the data storage system.

2. The method of claim 1 further comprising:
determining that the recovery of space accounting metadata of the at least one data volume in the volume family has proceeded past the region of metadata being accessed by the storage IO request; and
having determined that the recovery of space accounting metadata of the at least one data volume in the volume family has proceeded past the region of metadata being accessed by the storage IO request, updating the first count representative of the amount of physical storage space committed to the respective data volume, and updating the newly calculated count representative of the amount of physical storage space committed to the respective data volume.

3. The method of claim 1 further comprising:
determining that the recovery of space accounting metadata of the at least one data volume in the volume family has not proceeded past the region of metadata being accessed by the storage IO request; and
having determined that the recovery of space accounting metadata of the at least one data volume in the volume family has not proceeded past the region of metadata being accessed by the storage IO request, updating the first count representative of the amount of physical storage space committed to the respective data volume.

4. The method of claim 1 further comprising:
determining whether the recovery of space accounting metadata of the at least one data volume in the volume family has completed based on the current logical offset reaching the ending point for the tree walk.

5. The method of claim 4 further comprising:
having determined that the recovery of space accounting metadata of the at least one data volume in the volume family has completed, replacing the first count representative of the amount of physical storage space committed to the respective data volume with the newly calculated count representative of the amount of physical storage space committed to the respective data volume.

6. The method of claim 1 wherein the performing of the recovery of space accounting metadata of the at least one data volume in the volume family includes detecting a second discrepancy in a second amount of physical storage space committed or unique to the volume family.

7. The method of claim 6 wherein the performing of the recovery of space accounting metadata of the at least one data volume in the volume family further includes setting a second starting point and a second ending point for a second tree walk through the mapping hierarchy to verify second space accounting metadata for the volume family, the second space accounting metadata corresponding to a second count representative of the second amount of physical storage space committed or unique to the volume family.

8. The method of claim 7 wherein the performing of the recovery of space accounting metadata of the at least one data volume in the volume family further includes maintaining second corresponding space accounting metadata for the volume family, the maintained second corresponding space accounting metadata corresponding to a second newly calculated count representative of the second amount of physical storage space committed or unique to the volume family.

9. The method of claim 8 further comprising:
checking a second current logical offset from the second starting point for the second tree walk, and determining whether the recovery of space accounting metadata of the volume family has completed based on the second current logical offset reaching the second ending point for the second tree walk.

10. A method of performing recovery of space accounting metadata while a data storage system is online for regular user data access, comprising:
in an online process, performing recovery of space accounting metadata of at least one data volume in a volume family, the performing of the recovery of space accounting metadata including:
accessing a region of metadata pertaining to the at least one data volume in the volume family;
maintaining corresponding metadata pertaining to the at least one data volume in the volume family;
detecting a discrepancy in an amount of physical storage space committed or unique to the volume family;
setting a starting point and an ending point for a tree walk through a mapping hierarchy to verify space accounting metadata for the volume family, the space accounting metadata corresponding to a count representative of the amount of physical storage space committed or unique to the volume family; and
maintaining corresponding space accounting metadata for the volume family, the maintained corresponding space accounting metadata corresponding to a newly calculated count representative of the amount of physical storage space committed or unique to the volume family;
receiving a storage IO request for servicing at the data storage system;
determining whether the servicing of the storage IO request includes accessing the same region of metadata being accessed in the recovery of space accounting metadata of the at least one data volume in the volume family;
having determined that the servicing of the storage IO request includes accessing the same region of metadata as being accessed in the recovery of space accounting metadata of the at least one data volume in the volume family, permitting access to the region of metadata for servicing of the storage IO request, thereby assuring prompt access to data stored on the data storage system;
checking a current logical offset from the starting point for the tree walk; and
determining whether the recovery of space accounting metadata of the volume family has completed based on the current logical offset reaching the ending point for the tree walk.

11. The method of claim 10 further comprising:
having determined that the recovery of space accounting metadata of the volume family has completed, replacing the count representative of the amount of physical storage space committed or unique to the volume family with the newly calculated count representative of the amount of physical storage space committed or unique to the volume family.

12. A data storage appliance configured to perform recovery of space accounting metadata while online for regular user data access, comprising:
at least one storage device configured to store a plurality of data volumes of a volume family;

a memory configured to store executable instructions; and
storage processing circuitry configured to execute the executable instructions out of the memory:
  in an online process, to perform recovery of space accounting metadata of at least one data volume in the volume family, wherein performing of the recovery of space accounting metadata includes:
    accessing a region of metadata pertaining to the at least one data volume in the volume family;
    maintaining corresponding metadata pertaining to the at least one data volume in the volume family;
    detecting a discrepancy in an amount of physical storage space committed to a respective data volume in a branch of the volume family;
    setting a starting point and an ending point for a tree walk through a mapping hierarchy to verify space accounting metadata for the respective data volume, the space accounting metadata corresponding to a first count representative of the amount of physical storage space committed to the respective data volume;
    maintaining corresponding space accounting metadata for the respective data volume, the maintained corresponding space accounting metadata corresponding to a newly calculated count representative of the amount of physical storage space committed to the respective data volume; and
    performing the tree walk through the mapping hierarchy for the respective data volume from the starting point to the ending point;
  to receive a storage IO request;
  upon receipt of the storage IO request, to check a current logical offset from the starting point for the tree walk;
  to determine whether servicing of the storage IO request includes accessing the same region of metadata being accessed in the recovery of space accounting metadata of the at least one data volume in the volume family based on the current logical offset; and
  having determined that the servicing of the storage IO request includes accessing the same region of metadata as being accessed in the recovery of space accounting metadata of the at least one data volume in the volume family based on the current logical offset, to permit access to the region of metadata for servicing of the storage IO request, thereby assuring prompt access to data stored on the data storage system.

13. The data storage appliance of claim 12 wherein the storage processing circuitry is further configured to execute the executable instructions out of the memory to detect a second discrepancy in a second amount of physical storage space committed to the volume family.

14. The data storage appliance of claim 12 wherein the storage processing circuitry is further configured to execute the executable instructions out of the memory to detect a second discrepancy in a second amount of physical storage space unique to the volume family.

\* \* \* \* \*